(12) United States Patent
Horiuchi (10) Patent No.: US 12,523,433 B2
(45) Date of Patent: Jan. 13, 2026

(54) HEAT STORAGE DEVICE, POWER GENERATOR, AND HEAT GENERATOR

(71) Applicant: SHINKO ELECTRIC INDUSTRIES CO., LTD., Nagano (JP)

(72) Inventor: Michio Horiuchi, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 18/813,272

(22) Filed: Aug. 23, 2024

(65) Prior Publication Data
US 2025/0075984 A1 Mar. 6, 2025

(30) Foreign Application Priority Data
Aug. 28, 2023 (JP) .................. 2023-137853

(51) Int. Cl.
*F28D 20/02* (2006.01)
*F28D 20/00* (2006.01)

(52) U.S. Cl.
CPC ........ *F28D 20/025* (2013.01); *F28D 20/0056* (2013.01); *F28D 2020/006* (2013.01); *F28D 2020/0078* (2013.01)

(58) Field of Classification Search
CPC ............... F28D 20/025; F28D 20/0056; F28D 2020/006; F28D 2020/0078
See application file for complete search history.

(56) References Cited

U.S. PATENT DOCUMENTS

| | | | | |
|---|---|---|---|---|
| 8,900,853 B2 * | 12/2014 | Verhaar | ..................... | B01L 7/52 435/303.1 |
| 10,870,784 B2 | 12/2020 | Meroueh et al. | | |
| 2004/0197090 A1 * | 10/2004 | Kudo | ..................... | F28D 20/02 392/341 |
| 2014/0053554 A1 * | 2/2014 | Tartibi | ..................... | F01K 3/186 60/643 |
| 2015/0316328 A1 * | 11/2015 | Trainham | ................ | F03G 6/067 165/10 |
| 2021/0207527 A1 * | 7/2021 | Robinson | .............. | F16K 11/065 |
| 2022/0404103 A1 | 12/2022 | Seddegh et al. | | |

FOREIGN PATENT DOCUMENTS

| | | | |
|---|---|---|---|
| CA | 3171116 | | 9/2021 |
| CN | 202023653 U | * | 11/2011 |
| CN | 213542507 U | * | 6/2021 |
| JP | 2015-048393 | | 3/2015 |
| JP | 2021-031507 | | 3/2021 |
| WO | WO-2020125809 A1 | * | 6/2020 |

OTHER PUBLICATIONS

English Translation CN-202023653-U (Year: 2011).*
English Translation WO-2020125809-A1 (Year: 2020).*
English Translation CN-213542507-U (Year: 2021).*
Extended European search report dated Jan. 31, 2025 issued with respect to the corresponding European patent application No. 24196531.8.

* cited by examiner

*Primary Examiner* — Shafiq Mian
(74) *Attorney, Agent, or Firm* — IPUSA, PLLC (57) ABSTRACT

A heat storage device includes a ceramic part having a closed space therein, a latent heat storage provided inside the closed space, an electric heater provided inside the ceramic part and configured to heat the latent heat storage, a heat insulating member covering the ceramic part, and a power supply part configured to supply electric power to the electric heater.

22 Claims, 7 Drawing Sheets

HEAT STORAGE DEVICE, POWER GENERATOR, AND HEAT GENERATOR

CROSS-REFERENCE TO RELATED APPLICATIONS

This application is based upon and claims priority to Japanese Patent Application No. 2023-137853, filed on Aug. 28, 2023, the entire contents of which are incorporated herein by reference.

FIELD

Certain aspects of the embodiments discussed herein are related to heat storage devices, power generators, and heat generators.

BACKGROUND

Conventionally, a proposed latent heat storage uses an Al—Si alloy or the like as a phase change material (PCM), and a protective layer surrounding the PCM.

Further, a proposed heat storage device heats a heat storage using heated air. In the heat storage using the heat storage device, the air is heated using electric power, and the heat storage is heated using the heated air.

Related art include Japanese Laid-Open Patent Publication No. 2021-031507, and Japanese Laid-Open Patent Publication No. 2015-048393, for example.

In the conventional heat storage device, an energy loss is large until the heat storage using electric power.

SUMMARY

Accordingly, it is an object in one aspect of the embodiments to provide a heat storage device, a power generator, and a heat generator which can reduce an energy loss.

According to one aspect of the embodiments, a heat storage device includes a ceramic part having a closed space therein; a latent heat storage provided inside the closed space; an electric heater provided inside the ceramic part and configured to heat the latent heat storage; a heat insulating member covering the ceramic part; and a power supply part configured to supply electric power to the electric heater.

According to another aspect of the embodiments, a heat storage device includes a ceramic part having a closed space therein and including a material that generates heat when energized; a latent heat storage provided inside the closed space; a heat insulating member covering the ceramic part; and a power supply part configured to supply electric power to the ceramic part.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Hereinafter, embodiments will be described in detail with reference to the accompanying drawings. In the specification and the drawings, constituent elements or components having substantially the same functional configuration are designated by the same reference numerals, and a redundant description thereof may be omitted.

First Embodiment

Figure 1:
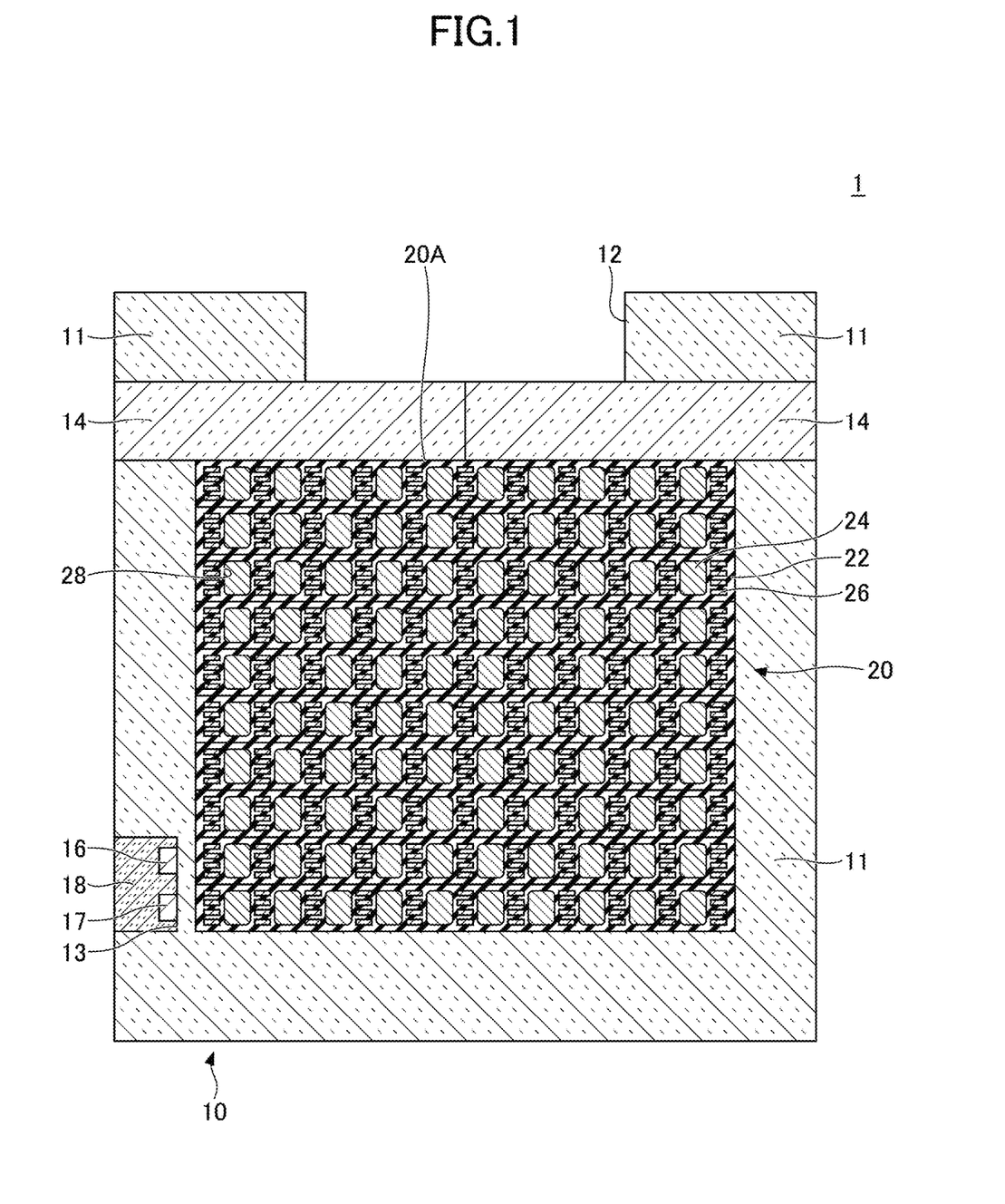
FIG. 1 is a cross sectional view illustrating an example of a heat storage device according to a first embodiment.
Figure 2:
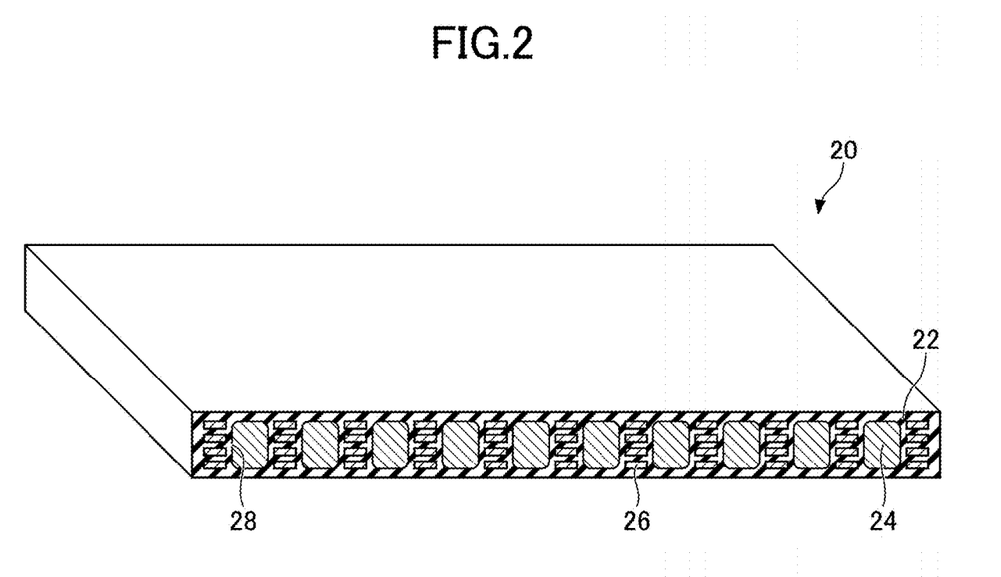
FIG. 2 is a perspective sectional view illustrating an example of a heat storage module according to the first embodiment.
Figure 3:
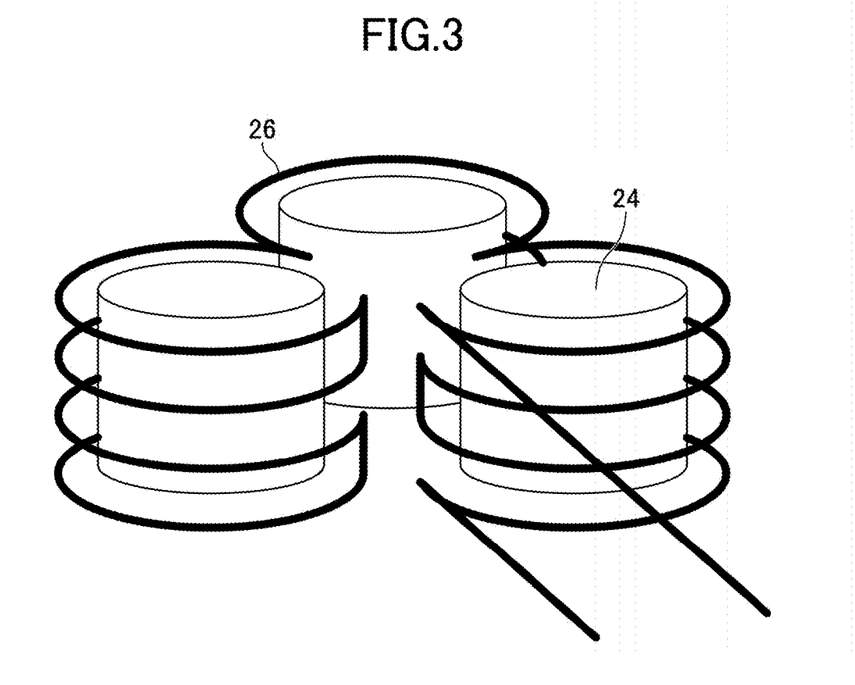
FIG. 3 is a diagram illustrating examples of a latent heat storage and an electric heater in the first embodiment.
Figure 4:
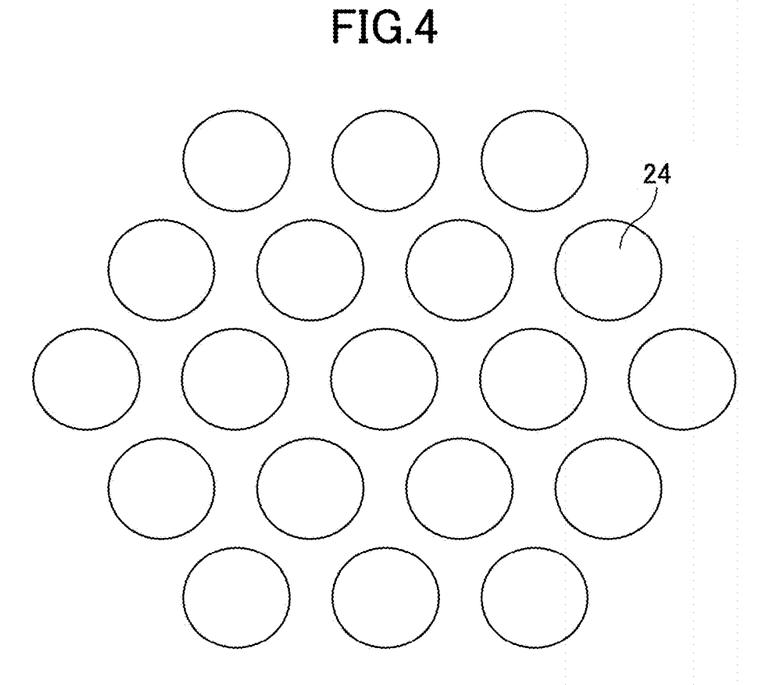
FIG. 4 is a diagram illustrating an example of an arrangement of latent heat storages in the first embodiment.

First, a first embodiment will be described. The first embodiment relates to a heat storage device. FIG. 1 is a cross sectional view illustrating an example of the heat storage device according to a first embodiment. FIG. 2 is a perspective cross sectional view illustrating an example of a heat storage module according to the first embodiment. FIG. 3 is a diagram illustrating examples of a latent heat storage and an electric heater in the first embodiment. FIG. 4 is a diagram illustrating an example of an arrangement of latent heat storages in the first embodiment.

As illustrated in FIG. 1, a heat storage device 1 according to the first embodiment includes a heat storage module 20, and a heat insulating member 10. For example, heat storage modules 20 among a plurality of heat storage modules 20 are laminated on one another.

The heat storage module 20 includes a ceramic part 22, a latent heat storage 24, and an electric heater 26. A plurality of closed spaces 28 are formed inside the ceramic part 22. The ceramic part 22 is integrally formed, for example. For example, the ceramic part 22 does not have connecting portions connected to the closed spaces 28. The latent heat storage 24 is provided inside the closed space 28. In other words, the latent heat storage 24 is encapsulated inside the ceramic part 22. That is, the latent heat storage 24 is airtightly covered with the ceramic part 22 which is a continuous body. The ceramic part 22 has a function of preventing leakage of melted latent heat storage 24. The latent heat storage 24 has a columnar shape, such as a circular column shape or the like. The latent heat storage 24 is provided inside each of the closed spaces 28. That is, a plurality of latent heat storages 24 are provided inside the ceramic part 22. The plurality of latent heat storages 24 are arranged such that long axes of the latent heat storages 24 are parallel to one another. As illustrated in FIG. 4, the plurality of latent heat storage 24 are densely arranged in a regular triangular lattice, for example.

The latent heat storage 24 is formed of a metal, for example. The latent heat storage 24 includes one element selected from aluminum, copper, silicon, and boron, or an arbitrary combination of two or more elements selected from aluminum, copper, silicon, and boron, for example.

A main component of the latent heat storage 24 may be aluminum. The latent heat storage 24 may include 99 mass % or more aluminum. That is, the latent heat storage 24 may be composed of aluminum with a purity of 99 mass % or more.

The main component of the latent heat storage 24 may be copper. The latent heat storage 24 may include 99 mass % or more copper. That is, the latent heat storage 24 may be composed of copper with a purity of 99 mass % or more.

The main component of the latent heat storage 24 may be silicon. The latent heat storage 24 may include 50 mass % or more silicon. The latent heat storage 24 may be composed of silicon with a purity of 50 mass % or more. Preferably, the latent heat storage 24 includes 99 mass % or more silicon, and is composed of silicon with a purity of 99 mass % or more. The latent heat storage 24 may include one element selected from boron (B), aluminum (Al), bismuth (Bi), antimony (Sb), gallium (Ga), copper (Cu), iron (Fe), titanium (Ti), yttrium (Y), indium (In), zinc (Zn), and tin (Sn), or an arbitrary combination of two or more elements selected from B, Al, Bi, Sb, Ga, Cu, Fe, Ti, Y, In, Zn, and Sn, and amounting to less than 50 mass % in total.

The main component of the latent heat storage 24 may be boron. The latent heat storage 24 may include 50 mass % or more boron. The latent heat storage 24 may be composed of boron with a purity of 50 mass % or more. Preferably, the latent heat storage 24 includes 80 mass % or more boron, and is composed of boron with a purity of 80 mass % or more. More preferably, the latent heat storage 24 includes 99 mass % or more boron, and is composed of boron with a purity of 99 mass % or more. The latent heat storage 24 may include one element selected from silicon (Si), aluminum (Al), iron (Fe), copper (Cu), and cobalt (Co), or an arbitrary combination of two or more elements selected from Si, Al, Fe, Cu, and Co, and amounting to less than 20 mass % in total.

In the case where the main component of the latent heat storage 24 is aluminum, the ceramic part 22 includes 96 mass % or more aluminum oxide ($Al_2O_3$), for example. That is, the ceramic part 22 may be composed of aluminum oxide with a purity of 96 mass % or more.

In the case where the main component of the latent heat storage 24 is copper, the ceramic part 22 includes 90 mass % or more aluminum oxide, or 90 mass % or more mullite ($3Al_2O_3 \cdot 2SiO_2$), or 95 mass % or more aluminum nitride (AlN), or 95 mass % or more mixture of aluminum nitride and boron nitride (BN), for example. The ceramic part 22 may further include a sintering aid or the like. Examples of the sintering aid include silicon, magnesium, calcium, or the like. Ceramic grains included in the ceramic part 22 preferably have a grain size of approximately 1 μm or less, and more preferably approximately 0.3 μm or less, for example.

In the case where the main component of the latent heat storage 24 is silicon, the ceramic part 22 includes one material selected from mullite, aluminum oxide ($Al_2O_3$), cordierite ($2MgO \cdot 2Al_2O_3 \cdot 5SiO_2$), anorthite ($CaAl_2Si_2O_8$), sillimanite ($Al_2SiO_5$), silicon nitride ($Si_3N_4$), boron nitride, aluminum nitride, a composite material (composite ceramic) of aluminum nitride and boron nitride, silicon carbide (SiC), tungsten carbide (WC), boron carbide ($B_4C$), molybdenum disilicide ($MoSi_2$), and tungsten disilicide ($WSi_2$), or an arbitrary combination of two or more materials selected from mullite, $Al_2O_3$, $2MgO \cdot 2Al_2O_3 \cdot 5SiO_2$, $CaAl_2Si_2O_8$, $Al_2SiO_5$, $Si_3N_4$, boron nitride, aluminum nitride, a composite material (composite ceramic) of aluminum nitride and boron nitride, silicon carbide, tungsten carbide, boron carbide, molybdenum disilicide, and tungsten disilicide, for example. The ceramic part 22 may be composed of one material selected from mullite, aluminum oxide, cordierite, anorthite, sillimanite, silicon nitride, boron nitride, aluminum nitride, a composite material of aluminum nitride and boron nitride, silicon carbide, tungsten carbide, boron carbide, molybdenum disilicide, and tungsten disilicide, or an arbitrary combination of two or more materials selected from mullite, aluminum oxide, cordierite, anorthite, sillimanite, silicon nitride, boron nitride, aluminum nitride, a composite material of aluminum nitride and boron nitride, silicon carbide, tungsten carbide, boron carbide, molybdenum disilicide, and tungsten disilicide.

In the case where the main component of the latent heat storage 24 is boron, the ceramic part 22 may include one material selected from boron nitride (BN), boron carbide ($B_4C$), aluminum nitride (AlN), a composite material of aluminum nitride and boron nitride, silicon nitride ($Si_3N_4$), and silicon carbide (SiC), or an arbitrary combination of two or more materials selected from BN, $B_4C$, AlN, a composite material of aluminum nitride and boron nitride, $Si_3N_4$, and SiC. The ceramic part 22 may be composed of one of materials selected from boron nitride, boron carbide, aluminum nitride, a composite material (composite ceramic) of aluminum nitride and boron nitride, silicon nitride, and silicon carbide, or an arbitrary combination of two or more materials selected from boron nitride, boron carbide, aluminum nitride, a composite material (composite ceramic) of aluminum nitride and boron nitride, silicon nitride, and silicon carbide.

In the case where the main component of the latent heat storage 24 is boron, the ceramic part 22 may include a boride. The ceramic part 22 may be composed of the boride. The boride is titanium boride ($TiB_2$), zirconium boride ($ZrB_2$), hafnium boride ($HfB_2$), vanadium boride ($VB_2$), niobium boride ($NbB_2$), tantalum boride ($TaB_2$), lanthanum boride ($LaB_6$), or an arbitrary combination thereof, for example.

The electric heater 26 is provided inside the ceramic part 22. The electric heater 26 is provided between a surface of the ceramic part 22 and a surface of the latent heat storage 24. The electric heater 26 generates Joule heat when energized. The electric heater 26 has an approximately cylindrical shape around each latent heat storage 24. The electric heater 26 forms a spiral while alternately repeating clockwise and counterclockwise turns, for example, when viewed from a direction parallel to a major axis of the columnar latent heat storage 24. The electric heater 26 can heat the latent heat storage 24. From a viewpoint of reducing a heat loss, a distance between the electric heater 26 and the latent heat storage 24 is preferably small. The electric heater 26 includes tungsten, or molybdenum, or both tungsten and molybdenum. The electric heater 26 may include a mixture of tungsten and aluminum oxide, or a mixture of molybdenum and aluminum oxide. In this case, the electric heater 26 may further include one or more kinds of materials selected from silicon oxide, magnesium oxide, calcium carbonate, or the like. The electric heater 26 is an example of a heater.

The heat insulating member 10 includes a main body 11, an openable and closable shutter 14, a first terminal 16, a second terminal 17, and a lid 18. The heat insulating member 10 covers a laminate of the plurality of heat storage modules 20. The heat insulating member 10 covers the ceramic part 22 of each heat storage module 20 of the plurality of heat storage modules 20.

The laminate of the plurality of heat storage modules 20 is accommodated inside the main body 11, and the shutter 14 is provided so as to make contact with a surface 20A of one heat storage module 20. In a closed state of the shutter 14, the surface 20A is covered by the shutter 14, and in an open state of the shutter 14, a portion of the surface 20A is exposed from the shutter 14. The heat insulating member 10 is formed with an opening 12 communicating with the portion of the surface 20A exposed from the shutter 14 in the open state of the shutter 14.

The same type of heat insulating material may be used for the main body 11 and the shutter 14, for example. A material that can suppress heat conduction and heat radiation, which are movement elements of heat, may be used for the main body 11 and the shutter 14. For example, a porous material made of a solid material having a low heat conductivity is used. The size of pores is preferably such that effects of convection of gas can be reduced, and the pores are preferably filled with a gas having a low heat conductivity at a pressure that is low as much as possible. The heat insulating member 10 may be configured to hold the laminate of the plurality of heat storage modules 20 in a vacuum, and a reflecting layer may be provided at a boundary between the main body 11 and the shutter 14.

The first terminal 16 and the second terminal 17 are provided inside a recess 13 that is formed in the main body 11. The first terminal 16 and the second terminal 17 are electrically connected to the electric heater 26. For example, the first terminal 16 is a positive terminal, and the second terminal 17 is a negative terminal. The first terminal 16 and the second terminal 17 are an example of a power supply part.

The lid 18 closes the recess 13. The lid 18 is composed of the same material as the main body 11 and the shutter 14, for example.

In the case where heat is stored in the heat storage device 1, the shutter 14 is closed, the lid 18 is removed, and a power supply cable is connected to the first terminal 16 and the second terminal 17. Further, electric power is supplied to the electric heater 26 via the power supply cable to cause the electric heater 26 to generate heat. The heat generated by the electric heater 26 is stored in the latent heat storage 24. That is, when the latent heat storage 24 is heated to a temperature higher than a solid-liquid phase change temperature (or liquidus temperature), latent heat generated by the phase change is stored in the latent heat storage 24. After supplying the electric power, the power supply cable is disconnected from the first terminal 16 and the second terminal 17, and the lid 18 is attached to the recess 13. As a result, the heat stored in the latent heat storage 24 is held in the latent heat storage 24 by the ceramic part 22 and the heat insulating member 10.

Moreover, in the case where the heat stored in the heat storage device 1 is to be used, the shutter 14 is opened with the lid 18 attached. As a result, the heat stored in the latent heat storage 24 flows out through the open portion of the shutter 14 and the opening 12. This heat can be utilized for electric power generation or heating of heater or the like.

Figure 5:
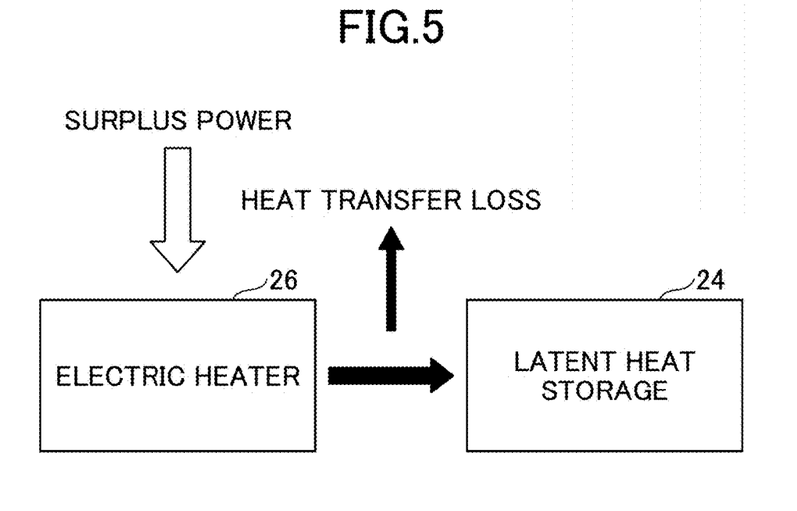
FIG. 5 is a diagram illustrating an example of a loss in the first embodiment.

According to the first embodiment, it is possible to reduce the energy loss until the heat storage using the electric power. For example, in a case where heat is stored using surplus electric power, the surplus electric power is supplied directly to the electric heater 26 as illustrated in FIG. 5. The heat generated by the electric heater 26 is stored in the latent heat storage 24, but a heat transfer loss may occur during storage of the heat. For example, the ceramic part 22 may be heated, or the heat insulating member 10 may be heated, and a portion of the heat may be released outside the heat storage device 1. However, the heat transfer loss occurs only at such locations. FIG. 5 is a diagram illustrating an example of the loss in the first embodiment.

On the other hand, in a case where air is heated by using the surplus electric power and the latent heat storage is heated by using the heated air, the heat transfer loss occurs when the air is heated, the heat transfer loss occurs during transport of the heated air, and the heat transfer loss also occurs when the latent heat storage is heated by using the heated air.

As described above, the heat storage device 1 according to the first embodiment can reduce the energy loss until the heat storage using the electric power, when compared to a heat storage device in which the heat storage is heated by using the heated air.

In addition, the latent heat storage 24 can store a large amount of heat when compared to a sensible heat storage. For example, aluminum can store heat that is approximately two times an amount storable by a sensible heat storage per unit mass, although the amount storable depends on a specific heat of the sensible heat material used. Moreover, a latent heat of fusion of silicon is four times or more the latent heat of fusion of aluminum, and the latent heat of fusion of boron is eleven times or more the latent heat of fusion of aluminum, per unit mass, and thus, a large amount of heat can be stored thereby. Accordingly, by using the latent heat storage 24, it is possible to obtain an energy storage density higher than that of a lithium ion battery. For this reason, the heat storage device 1 can store a large amount of energy with a small size.

First Modification of First Embodiment

Figure 6:
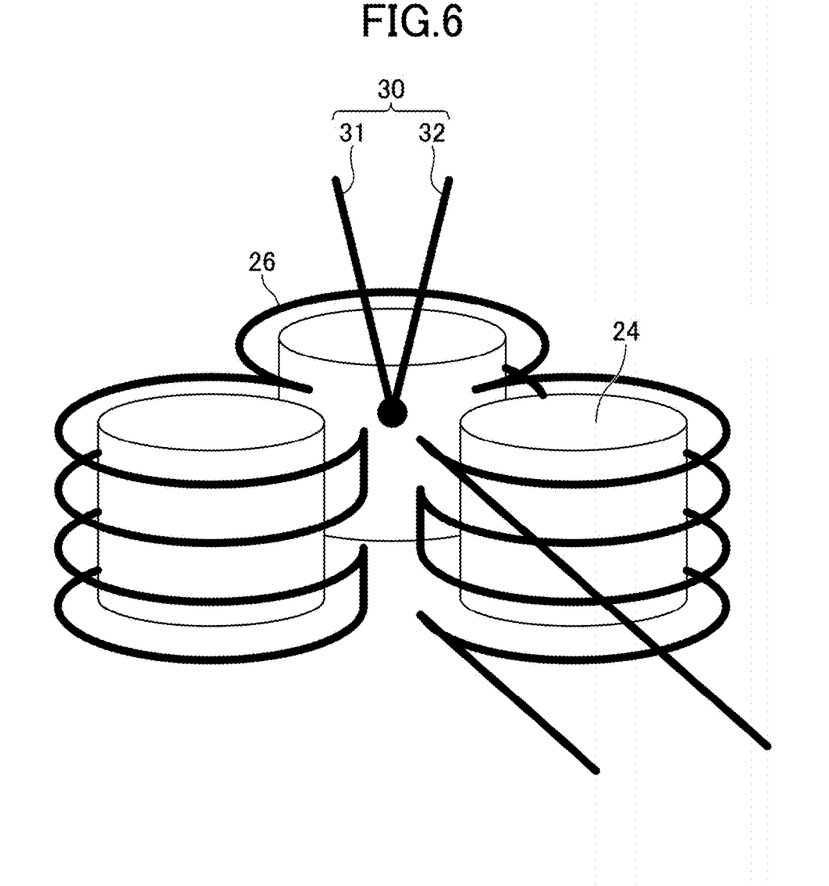
FIG. 6 is a diagram illustrating an example of the latent heat storage, the electric heater, and a thermocouple according to a first modification of the first embodiment.

A first modification of the first embodiment will be described. The first modification differs from the first embodiment in that a thermocouple is provided. FIG. 6 is a diagram illustrating examples of the latent heat storage, the electric heater, and a thermocouple according to the first modification of the first embodiment.

In the first modification, a thermocouple 30 is provided inside the heat storage module 20, as illustrated in FIG. 6. The thermocouple 30 includes a first conductor 31 and a second conductor 32. One end of the first conductor 31 is connected to one end of the second conductor 32. The first conductor 31 and the second conductor 32 have mutually different thermoelectric powers. For example, the first conductor 31 and the second conductor 32 include a tungsten-rhenium alloy, the first conductor 31 is composed of 5 mass % rhenium and 95 mass % tungsten, and the second conductor 32 is composed of 26 mass % rhenium and 74 mass % tungsten.

Otherwise, the configuration of the first modification is the same as that of the first embodiment.

The first modification can also obtain effects similar to those obtainable by the first embodiment. Further, because the thermocouple 30 is provided, it is possible to easily grasp the state of the latent heat storage 24. For example, in the heat storage process, the temperature indicated by the thermocouple 30 increases with the lapse of time while the latent heat storage 24 is solid, whereas the temperature indicated by the thermocouple 30 is stable while the phase of the latent heat storage 24 changes from solid to liquid. Thereafter, when the phase change is completed, the temperature indicated by the thermocouple 30 rises again with the lapse of time. Accordingly, it is possible to easily grasp whether the phase change has started, whether the phase change is continuing, or whether the phase change is completed.

In the heat storage device, even if the latent heat storage 24 after the completion of the phase change to liquid is further heated, the latent heat cannot be stored, and the input energy may be wasted. In contrast, in the present embodiment, because the completion of the phase change can be detected using the thermocouple 30, after the phase change is completed, it is possible to avoid wasting the energy by storing the heat in another heat storage device 1.

Second Modification of First Embodiment

Figure 7:
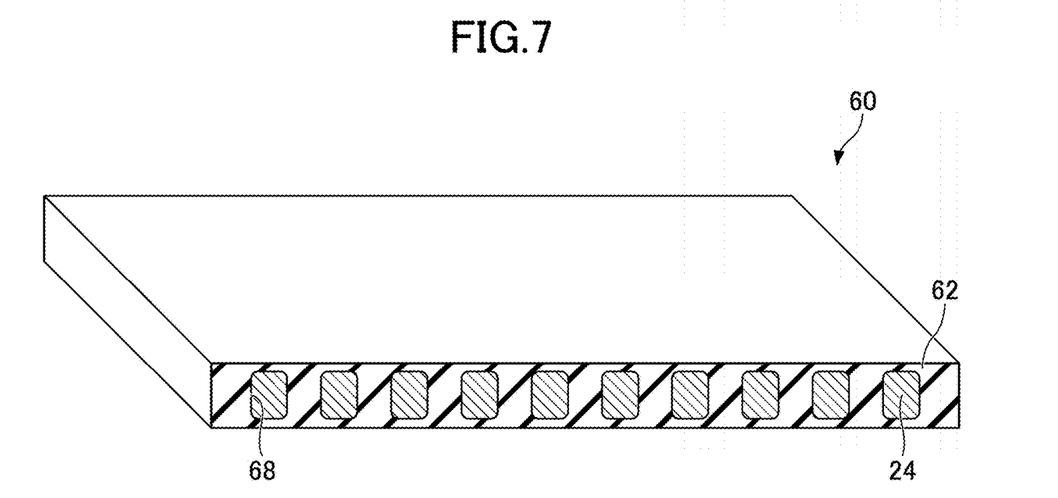
FIG. 7 is a perspective sectional view illustrating an example of the heat storage module according to a second modification of the first embodiment.

Next, a second modification of the first embodiment will be described. The second modification differs from the first embodiment in that the heat storage module has a configuration different from that of the first embodiment. FIG. 7 is a perspective cross sectional view illustrating an example of the heat storage module according to the second modification of the first embodiment.

The heat storage device according to the second modification includes a heat storage module 60 in place of the heat storage module 20. The heat storage module 60 includes a ceramic part 62, and the latent heat storage 24. A plurality of closed spaces 68 are formed inside the ceramic part 62. The ceramic part 62 has the same configuration as the ceramic part 22, but a material used for the ceramic part 62 is different from the material used for the ceramic part 22.

Examples of the material used for the ceramic part 62 include carbides. The carbides include silicon carbide, tungsten carbide, and boron carbide. Silicon carbide, tungsten carbide, and boron carbide have conductivity, although the conductivity depends on a carbon content. Silicon carbide, tungsten carbide, and boron carbide are materials that generate heat when energized, and silicon carbide, tungsten carbide, and boron carbide can be used as a heater. In the case where the ceramic part 62 includes silicon carbide, tungsten carbide, or boron carbide, the ceramic part 62 has functions of protecting and heating the latent heat storage 24, and thus, a higher heat storage density can easily be achieved.

Examples of the material used for the ceramic part 62 include silicides. The silicides include molybdenum disilicide ($MoSi_2$) and tungsten disilicide ($WSi_2$). Molybdenum disilicide and tungsten disilicide are materials that generate heat when energized. When the ceramic part 62 includes molybdenum disilicide or tungsten disilicide, the ceramic part 62 has the functions of protecting and heating the latent heat storage 24, and thus, a higher heat storage density can easily be achieved. Further, in atmosphere, a dense oxide film of silicon dioxide ($SiO_2$) is formed on surfaces of the molybdenum disilicide and the tungsten disilicide, and oxidation of the inside of the molybdenum disilicide and the tungsten disilicide is prevented. Accordingly, the ceramic part 62 including the molybdenum disilicide or the tungsten disilicide is chemically stable even in the atmosphere.

In the second modification, the electric power is supplied from the first terminal 16 and the second terminal 17 to the ceramic part 22.

Otherwise, the configuration of the second modification is the same as that of the first embodiment.

The second modification can also obtain effects similar to those obtainable by the first embodiment.

Second Embodiment

Figure 8:
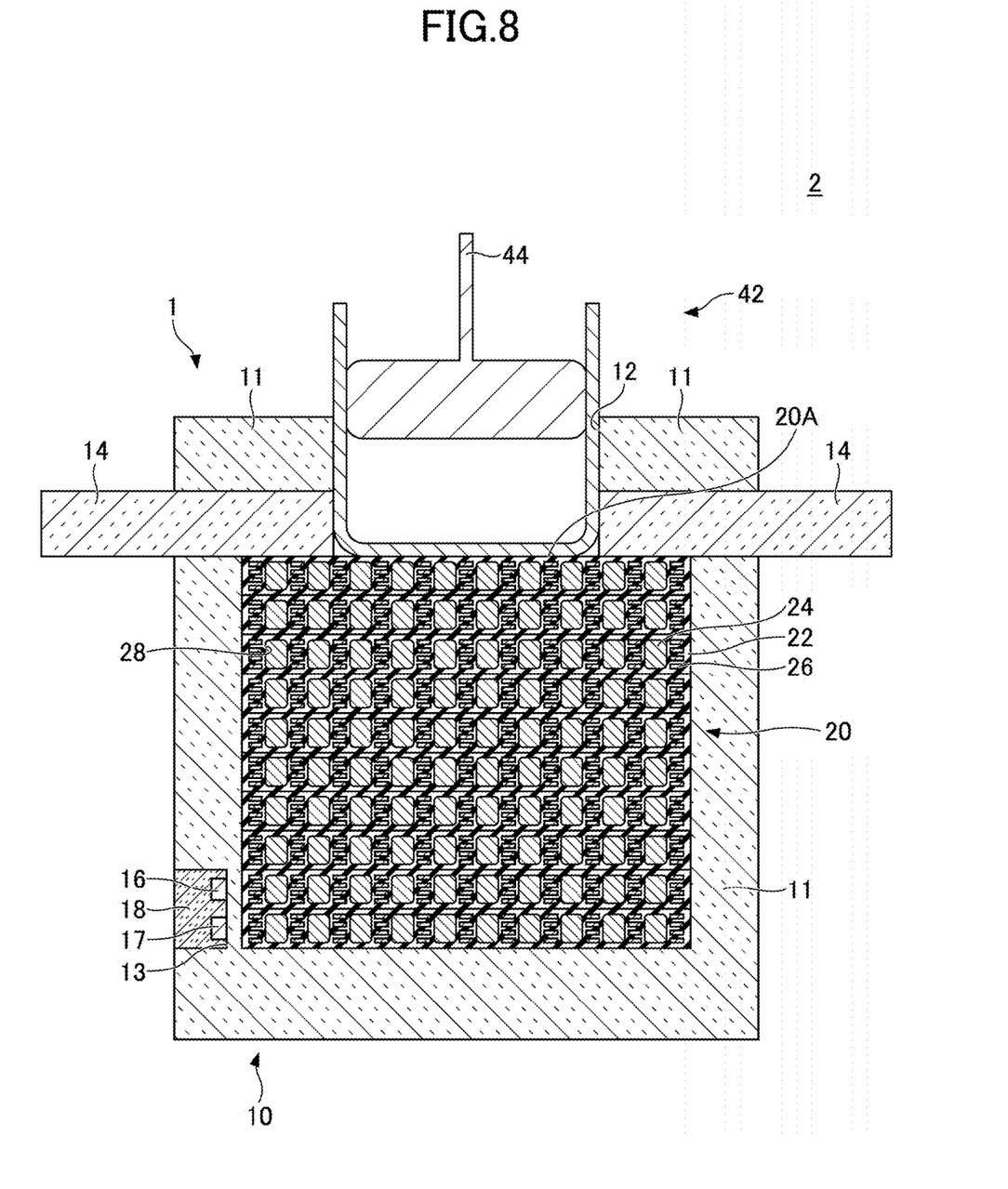
FIG. 8 is a cross sectional view illustrating an example of a power generator according to the second embodiment.
Figure 9:
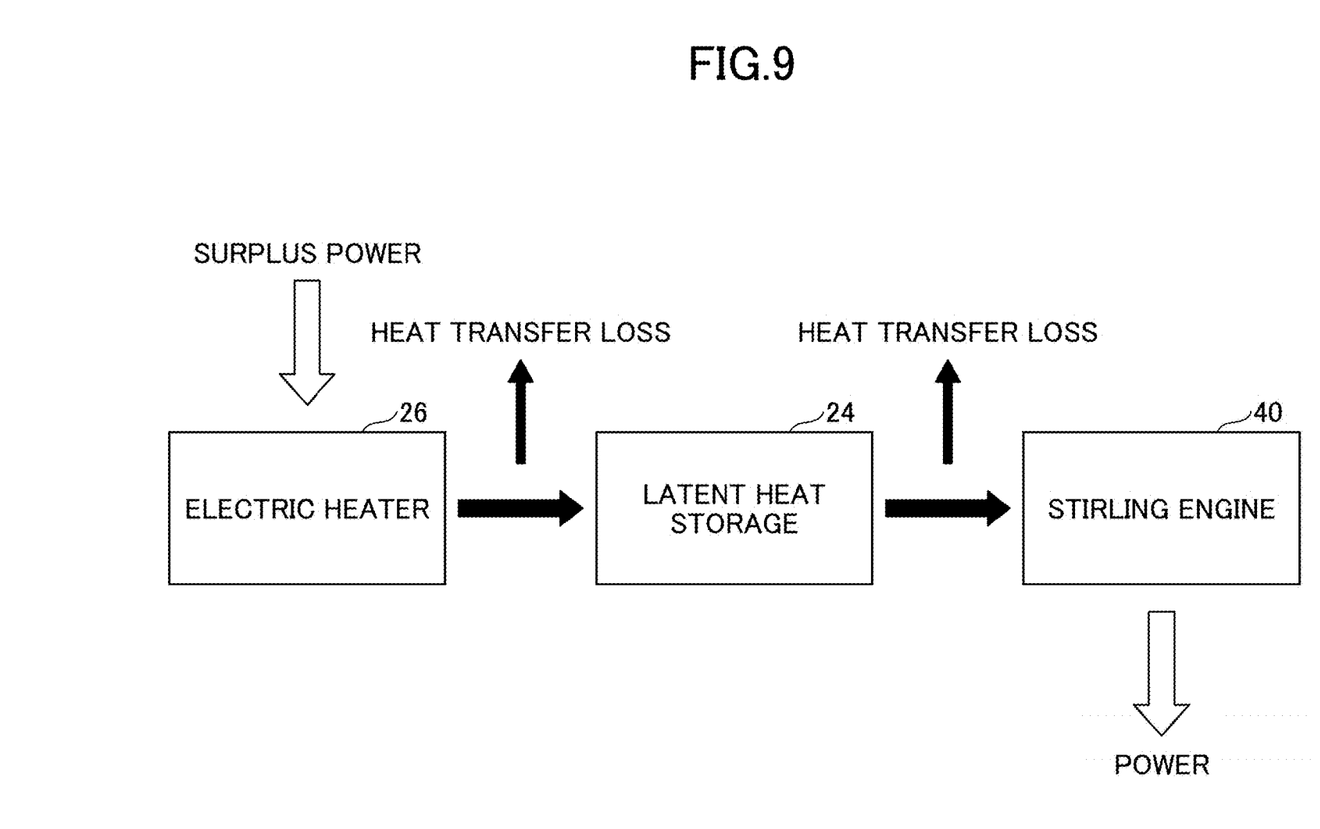
FIG. 9 is a diagram illustrating an example of the loss in the second embodiment.

Next, a second embodiment will be described. The second embodiment relates to a power generator including the heat storage device 1. FIG. 8 is a cross sectional view illustrating an example of the power generator according to the second embodiment. FIG. 9 is a diagram illustrating an example of the loss in the second embodiment.

As illustrated in FIG. 8 and FIG. 9, a power generator 2 according to the second embodiment includes the heat storage device 1, and a Stirling engine 40. The Stirling engine 40 includes a high temperature side cylinder 42 having a displacer piston 44, and a low temperature side cylinder (not illustrated). The shutter 14 of the heat storage device 1 is open, and the high temperature side cylinder 42 makes contact with the surface 20A of the heat storage module 20 through the opening 12 and the open portion of the shutter 14.

In the power generator 2 according to the second embodiment, the heat storage device 1 stores heat as in the first embodiment. A gas inside the high temperature side cylinder 42 absorbs the heat stored in the latent heat storage 24 through the open shutter 14. Further, the gas inside the high temperature side cylinder 42 thermally expands. As a result, the Stirling engine 40 perform the work to generate electric power.

The power generator 2 according to the second embodiment includes the heat storage device 1, and can thus reduce the energy loss until the heat storage using the electric power. In addition, it is possible to also reduce the energy loss even when the electric power is generated using the heat stored in the heat storage device 1. That is, as illustrated in FIG. 9, a heat transfer loss may occur when the heat stored in the latent heat storage 24 is transferred to the Stirling engine 40, but the heat transfer loss occurs only at this location. In general, the Stirling engine has a higher energy efficiency than an internal combustion engine and a steam engine, and the efficiency of the Stirling engine becomes closer to an efficiency of a Carnot cycle as a temperature difference between the high temperature side cylinder and the low temperature side cylinder increases.

In contrast, in a case where the air is heated by the heat stored in the latent heat storage 24, the steam is generated by using the heated air, and a turbine is rotated to generate the electric power, the heat transfer loss occurs when the air is heated, the heat transfer loss occurs during the transport of the heated air, and the heat transfer loss also occurs when the steam is generated by using the heated air.

As described above, the power generator 2 according to the second embodiment can reduce the energy loss between the heat storage and the electric power generation, when compared to the power generator that generates the steam by using the heated air and generates the electric power by rotating the turbine by the steam. Accordingly, even if the power generator 2 is small, it is possible to obtain a high energy efficiency with a small heat loss, and for example, the power generator 2 is suitable for utilizing the surplus power of a small-scale distributed power generation facility in a solar power generation facility, a wind power generation facility, or the like.

Moreover, because the high temperature side cylinder 42 is configured to be attachable to and detachable from the heat storage device 1, it is possible to prevent heat radiation through the high temperature side cylinder 42 by detaching and removing the high temperature side cylinder 42 when storing the heat.

Third Embodiment

Figure 10:
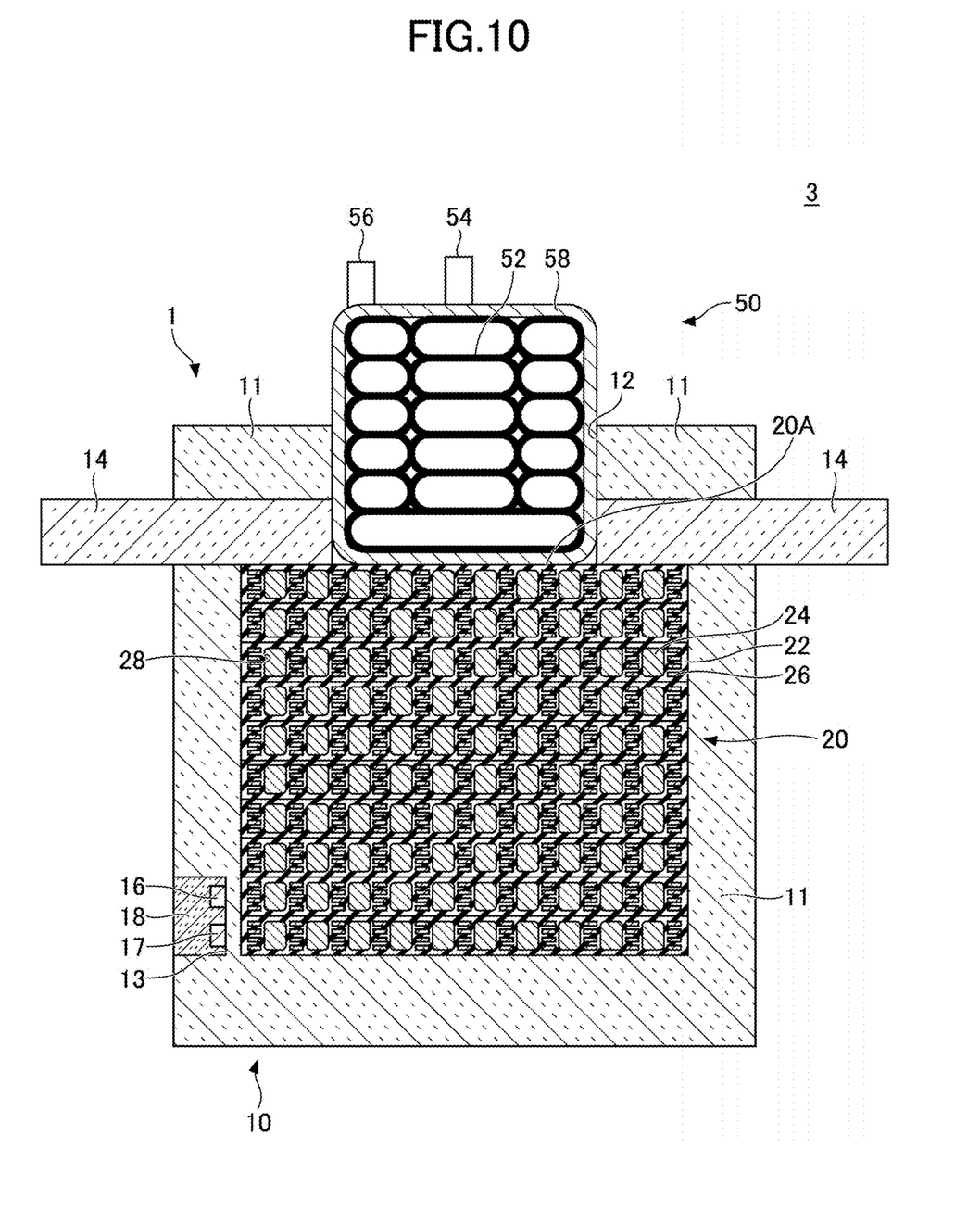
FIG. 10 is a cross sectional view illustrating an example of the heat generator according to a third embodiment.

Next, a third embodiment will be described. The third embodiment relates to a heat generator including the heat storage device 1. FIG. 10 is a cross sectional view illustrating an example of the heat generator according to the third embodiment.

As illustrated in FIG. 10, a heat generator 3 according to the third embodiment includes the heat storage device 1, and a heat exchanger 50. The heat exchanger 50 includes a housing 58, an internal flow path 52, a first external flow path 54, and a second external flow path 56. The internal flow path 52 is provided inside the housing 58, and the first external flow path 54 and the second external flow path 56 are provided outside the housing 58. The internal flow path 52 has an inlet end and an outlet end, the first external flow path 54 is connected to the inlet end, and the second external flow path 56 is connected to the outlet end. A heating medium flows through the internal flow path 52, the first external flow path 54, and the second external flow path 56.

The shutter 14 of the heat storage device 1 is open, and the heat exchanger 50 makes contact with the surface 20A of the heat storage module 20 through the opening 12 and the open portion of the shutter 14.

In the heat generator 3 according to the third embodiment, the heat storage device 1 stores the heat as in the first embodiment. The heating medium inside the internal flow path 52 absorbs the heat stored in the latent heat storage 24 through the open shutter 14.

The heat generator 3 according to the third embodiment includes the heat storage device 1, and thus, it is possible to reduce the energy loss until the heat storage using the electric power. Further, it is possible to reduce the energy loss even when the heat stored in the heat storage device 1 is used to generate the heat. That is, the heating medium flows from the first external flow path 54 into the internal flow path 52, and the heating medium is heated by the heat storage module 20. Then, the heated heating medium flows out from the internal flow path 52 to the second external flow path 56. A heat transfer loss may occur when the heat stored in the latent heat storage 24 is transferred to the heating medium, but the heat transfer loss occurs only at this location.

Moreover, because the heat exchanger 50 is configured to be attachable to and detachable from the heat storage device 1, the heat exchanger 50 can be detached and removed to prevent the heat radiation through the heat exchanger 50 when storing the heat.

The heat generator 3 can be used for the heater or the like for heating a space inside a house, for example.

According to the disclosed technique, it is possible to reduce an energy loss.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A heat storage device comprising:
   a ceramic part having a closed space therein;
   a latent heat storage provided inside the closed space;
   an electric heater provided inside the ceramic part and configured to heat the latent heat storage;
   a heat insulating member covering the ceramic part; and
   a power supply part configured to supply electric power to the electric heater, wherein:
   the heat insulating member includes an openable and closable shutter,
   in a closed state of the shutter, the shutter makes contact with a surface of the ceramic part and the surface of the ceramic part is covered by the shutter, and
   in an open state of the shutter, a portion of the surface of the ceramic part is exposed from the shutter.

2. The heat storage device as claimed in claim 1, wherein the latent heat storage includes one element selected from a group consisting of aluminum, copper, silicon, and boron, or an arbitrary combination of two or more elements selected from the group.

3. The heat storage device as claimed in claim 1, further comprising:
   a thermocouple configured to detect a completion of a phase change of the latent heat storage.

4. A power generator comprising:
   the heat storage device as claimed in claim 1; and
   a heat engine configured to generate electric power using heat stored in the latent heat storage.

5. The power generator as claimed in claim 4, wherein:
   the heat engine has a cylinder, and
   a gas inside the cylinder absorbs the heat stored in the latent heat storage and thermally expands.

6. The power generator as claimed in claim 5, wherein:
   the heat insulating member is configured to be openable and closable, and
   the gas inside the cylinder absorbs the heat stored in the latent heat storage through an open portion of the heat insulating member.

7. The power generator as claimed in claim 5, wherein the cylinder is attachable to and detachable from the heat storage device.

8. A heat generator comprising:
   the heat storage device as claimed in claim 1; and
   a heat exchanger including a flow path and configured to transfer heat stored in the latent heat storage to a heating medium in the flow path.

9. The heat generator as claimed in claim 8, wherein:
   the heat insulating member is configured to be openable and closable, and
   the heating medium in the flow path absorbs the heat stored in the latent heat storage through an open portion of the heat insulating member.

10. The heat generator as claimed in claim 8, wherein the heat exchanger is attachable to and detachable from the heat storage device.

11. A heat storage device comprising:
    a ceramic part having a closed space therein and including a material that generates heat when energized;
    a latent heat storage provided inside the closed space;
    a heat insulating member covering the ceramic part; and
    a power supply part configured to supply electric power to the ceramic part, wherein:
    the heat insulating member includes an openable and closable shutter, in a closed state of the shutter, the shutter makes contact with a surface of the ceramic part and the surface of the ceramic part is covered by the shutter, and in an open state of the shutter, a portion of the surface of the ceramic part is exposed from the shutter.

12. The heat storage device as claimed in claim 11, wherein the latent heat storage includes one element selected from a group consisting of aluminum, copper, silicon, and boron, or an arbitrary combination of two or more elements selected from the group.

13. The heat storage device as claimed in claim 11, further comprising:
a thermocouple configured to detect a completion of a phase change of the latent heat storage.

14. A power generator comprising:
the heat storage device as claimed in claim 11; and
a heat engine configured to generate electric power using heat stored in the latent heat storage.

15. The power generator as claimed in claim 14, wherein:
the heat engine has a cylinder, and
a gas inside the cylinder absorbs the heat stored in the latent heat storage and thermally expands.

16. The power generator as claimed in claim 15, wherein:
the heat insulating member is configured to be openable and closable, and
the gas inside the cylinder absorbs the heat stored in the latent heat storage through an open portion of the heat insulating member.

17. The power generator as claimed in claim 15, wherein the cylinder is attachable to and detachable from the heat storage device.

18. A heat generator comprising:
the heat storage device as claimed in claim 11; and
a heat exchanger including a flow path and configured to transfer heat stored in the latent heat storage to a heating medium in the flow path.

19. The heat generator as claimed in claim 18, wherein:
the heat insulating member is configured to be openable and closable, and
the heating medium in the flow path absorbs the heat stored in the latent heat storage through an open portion of the heat insulating member.

20. The heat generator as claimed in claim 18, wherein the heat exchanger is attachable to and detachable from the heat storage device.

21. The heat storage device as claimed in claim 1, wherein:
a main component of the latent heat storage is boron amounting to 50 mass % or more, and
the ceramic part is composed of boride.

22. The heat storage device as claimed in claim 1, wherein:
a main component of the latent heat storage is boron amounting to 50 mass % or more, and
the ceramic part includes titanium boride ($TiB_2$), zirconium boride ($ZrB_2$), hafnium boride ($HfB_2$), vanadium boride ($VB_2$), niobium boride ($NbB_2$), tantalum boride ($TaB_2$), lanthanum boride ($LaB_6$), or an arbitrary combination thereof.

* * * * *